Dec. 9, 1969     K. H. ARNOLD     3,482,816
LOW FRICTION SHEAR SEAL VALVE
Filed Feb. 19, 1968     2 Sheets-Sheet 1

INVENTOR
KURT HERBERT ARNOLD
BY Darby & Darby
ATTORNEYS

Dec. 9, 1969      K. H. ARNOLD      3,482,816

LOW FRICTION SHEAR SEAL VALVE

Filed Feb. 19, 1968      2 Sheets-Sheet 2

INVENTOR
KURT HERBERT ARNOLD

BY Darby & Darby

ATTORNEYS

# United States Patent Office 3,482,816
Patented Dec. 9, 1969

3,482,816
LOW FRICTION SHEAR SEAL VALVE
Kurt Herbert Arnold, Saddle Brook, N.J., assignor to Valcor Engineering Corporation, Kenilworth, N.J., a corporation of New Jersey
Filed Feb. 19, 1968, Ser. No. 706,525
Int. Cl. F16k 3/10, 15/02
U.S. Cl. 251—329
2 Claims

ABSTRACT OF THE DISCLOSURE

A valve with a self-aligning, pressure balanced tubular seating element that seats against an apertured shear plate which moves into and out of alignment with the valve seating element. The shear plate being balanced against the force of the inlet pressure and the seating element by low friction rolling guide means.

---

This invention relates to valves and more specifically to an on-off type valve having an aligned movable apertured shear plate, a self-aligning pressure balanced seating element that seats against the shear plate, and rolling guide means for movably supporting the shear plate in a substantially friction-free manner.

Several factors are important to the proper performance of on-off type valves. Among these are the requirements that (1) the valve seating element must seat securely when the valve is in its closed position, (2) the force required to change the valve between its open and closed position must be kept at a minimum, (3) wear on the valve seat should be minimized, and (4) the valve should permit maximum flow of the medium through the valve with minimum turbulence when the valve is open.

This invention provides a valve construction which is especially adapted to meet these requirements. A shear plate is movably mounted in the valve body between the inlet and outlet ports. The shear plate has an aperture or orifice of sufficient diameter to allow the desired full open flow through the valve at the design inlet and outlet pressures. The shear plate is moved vertically by a valve actuator to position the shear plate orifice for the open or closed position of the valve. This actuator may be of any conventional type such as a solenoid actuating mechanism.

Cooperating with the shear plate is a tubular seating element which seats against the shear plate. This seating element is disposed between the shear plate and the inlet port of the valve and coaxial with the axes of the inlet and outlet ports. In the closed position the seating element seals the inlet chamber of the valve so as to prevent flow of the medium past the shear plate to the outlet port.

When the valve is opened, the shear plate slides against the seating face of the tubular seating element until the shear plate orifice is aligned with the opening of the tubular seating element. In this position the medium is permitted to flow from the inlet port, through the inlet chamber, the tubular seating element, and thence through the shear plate orifice and the outlet port to the desired discharge point. In one form of the invention the tubular seating element is axially aligned against the shear plate in a slightly oversized cylindrical bore in the inlet chamber of the valve. It is held in that position by the inlet pressure and a compression spring. The clearance between the bore and the seating element provides a limited degree of floating motion to the seating element both axially and laterally relative to the body. The seating element is flexibly sealed to the bore by a pliable seal means such as an O-ring. Thus the seating element can shift slightly under the combined force of the compression spring and the inlet pressure to seat itself securely against the shear plate.

An important feature of the invention is the manner in which the shear plate is movably mounted. As pointed out above, the shear plate moves in a sliding engagement with the tubular seating element. A low friction rolling support means engages the outlet face of the shear plate to rollably support the shear plate against the force exerted by the seating element and the inlet pressure seating element 20. Element 20 is movably sealed to chamber 13 by any conventional pliable sealing means such as O-ring 21 which is mounted in the recess between annular rings 22 and 23 of element 20. The outer diameter of element 20 is slightly smaller than the inner diameter of inlet chamber 13, thus permitting element 20 the limited freedom of movement of element 20 inside chamber 13 referred to above.

Seating face 24 of element 20 is pressed against the inlet face 25 of shear plate 26 by compression spring 27. Spring 27 is housed between the outer shoulder of ring 22 and the outer shoulder of inlet chamber 13.

In addition to the force exerted by spring 27 the inlet pressure of the medium passing through the valve also acts to force seating element 20 against shear plate 26. This inlet pressure acts on the effective annular area of element 20 facing the inlet pressure. This annular area is the cross-sectional area of element 20 and O-ring 21 taken on a plane passing through the ring of contact between O-ring 21 and inlet chamber 13.

As noted above, valve element 20 has an outside diameter which is slightly smaller than the inside diameter of inlet chamber 13, thus providing element 20 with a limited freedom of movement. This clearance between element 20 and inlet chamber 13 permits element 20 to align and seat itself securely against shear plate 26 under the combined force of spring 27 and inlet pressure on the effective annular area of element 20.

Shear plate 26 which is shown in closed position in the drawings has an orifice 30 having a diameter approximately equal to the inside diameter of tubular valve element 20. When the valve is changed to its open position, shear plate 26 is raised relative to the valve body 10 so as to align orifice 30 with the inner surface of tubular valve element 20, thus providing an unobstructed path between inlet port 12 and outlet port 16 for substantially streamline flow of the medium being of flow rates for a limited range of valve actuating inputs.

Another object is to provide a low-friction balancing means for movably guiding a movable shear plate in a balanced shear seal valve.

Another object is to provide a valve design permitting unimpeded, streamline flow of a medium through the valve in its open position.

Another object of this invention is to provide a valve control means with improved wear characteristics and minimum power actuation requirements.

These and other objects and advantages of the invention will become apparent from the following detailed description of the invention in which reference is made to the accompanying drawings in which.

Figure 1:
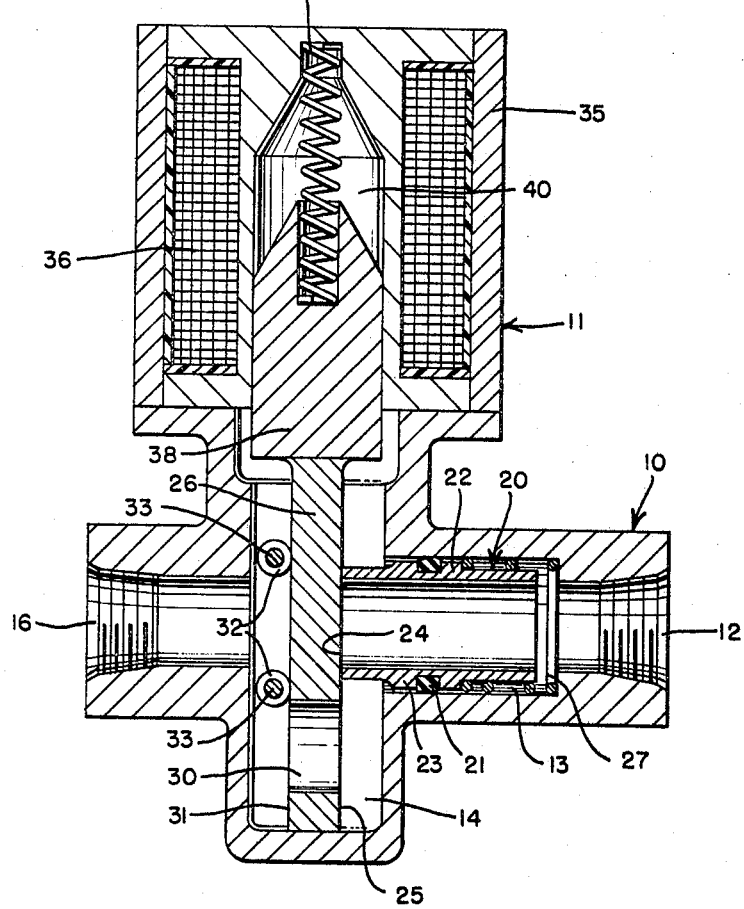
FIG. 1 is a vertical sectional view of a valve made in accordance with the invention.
Figure 2:
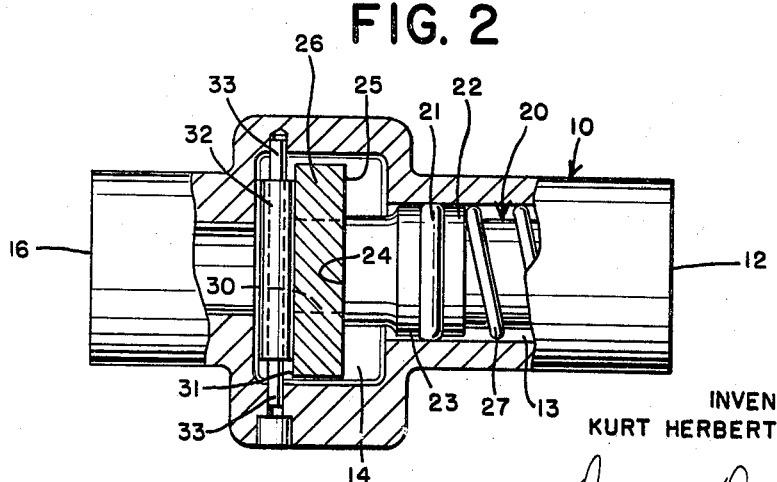
FIG. 2 is a bottom view in partial section of the valve shown in FIG. 1.

Referring to FIGS 1 and 2, the valve comprises valve body 10 and valve actuator 11. Valve body 10 includes inlet port 12, inlet chamber 13, central chamber 14, and outlet port 16. Inlet chamber 13 is cylindrically shaped on a central axis which is common with the axes of inlet and outlet ports 12 and 16 respectively.

Coaxially positioned in inlet chamber 13 is tubular rolling support reduces friction loses of valve actuation to a minimum and thereby reduces valve actuation power requirements. The valve actuator must also overcome friction between the seating face of the tubular seating element and the inlet face of the shear plate in order to move the shear plate between its open and closed position. This frictional force is a function of the inlet pressure acting against the effective annular area of the seating element and O-ring assembly, combined with the spring force exerted by the compression spring between the seating element and the valve body. By varying the effective annular area of the seating element and O-ring assembly this force can be kept at the minimum required for effective sealing between the shear plate and the seating element, thus minimizing power actuating requirements. The compression spring is used to insure adequate sealing force at very low inlet pressures.

In further regard to the advantages of this shear plate support and seating element arrangement, it is also important to recognized that the friction force which must be overcome in actuating the valve varies linearly with the perimeter of the effective annular area of the valve; whereas the flow capacity of the valve varies exponentially. This results from the low friction losses resulting from the rolling support means, and by the ability to keep the force with which the seating element engages the shear plate at the minimum required for sealing between these two elements. Consequently the throughput of the valve can be exponentially increased while the force required to actuate the valve is increased only linearly. Thus this valve adapts itself to a wide range of throughputs for a given actuating power source.

Thus, a principal object of the present invention is to provide a simple, effective on-off type valve having a wide range handled by the valve.

As pointed out above, the force exerted by compression spring 27 and by the inlet pressure acting against the effective annular area of element 20 forces tubular element 20 against shear plate 26. This lateral force on the inlet face 25 of shear plate 26 is balanced on the outlet face 31 of shear plate 26 by a pair of vertically aligned rollers 32 which are rotatably mounted in valve body 10 by means of pins 33 extending from opposite ends of the rollers. Rollers 32 vertically align shear plate 26 and guide the movement of shear plate 26 along on vertical path when shear plate 26 is moved between its open and closed position.

Valve actuator 11 is provided to move shear plate 26 between its open and closed position. Actuator 11 causes plate 26 to roll against rollers 32 on its outlet face 21 and slide against cylindrical valve seat 24 of valve element 20 on its inlet face 25. Thus rolling friction of rollers 32 on outlet face 31 and the sliding friction of valve seat 24 on inlet face 25 must be overcome in order to move shear plate 26 between its closed and open position.

The force required to shift shear plate 26 in this manner is provided by valve actuator 11 which includes housing 35, solenoid coil 36 cylindrically mounted inside housing 35, solenoid base 37, and paramagnetic plunger 38 which is attached to and moves with shear plate 26. Plunger 38 is reciprocally mounted in bore 40 and urged downwardly by compression spring 41 interposed between a central recess in solenoid base 37 and a central recess in plunger 38.

When solenoid coil 32 is actuated, magnetic force lifts plunger 38 and thereby shear plate 26 until plunger 38 engages solenoid base 37. This aligns orifice 30 with tubular element 20, thus permitting unobstructed flow of the medium through the valve.

As referred to above, the force required for actuation of the valve is kept at a minimum by balancing the shear plate 26 against rollers 32. The total lateral force acting on the inlet face of shear plate 26 is the sum of the inlet pressure force (inlet pressure multiplied by the effective cross-sectional area of seating element 20) plus the force exerted by spring 27. This total force is balanced on the outlet side of shear plate 26 by rollers 32. When shear plate 26 is raised or lowered, this lateral force produces a rolling friction component (caused by rollers 32) which resists this movement of shear plate 26. This rolling friction component, however, dissipates very little power in the movement of shear plate 26. In addition there is a sliding friction component between seating element 20 and the inlet face of shear plate 26. But this can be minimized by controlling the force with which element 20 engages plate 26 so as to provide the minimum required sealing pressure between the two, as referred to above.

Thus, the major force acting on plate 26 is balanced by rollers 32. The rollers cause the minimal friction losses when plate 26 is raised or lowered, thus resulting in minimum valve actuation power requirements.

Figure 3:
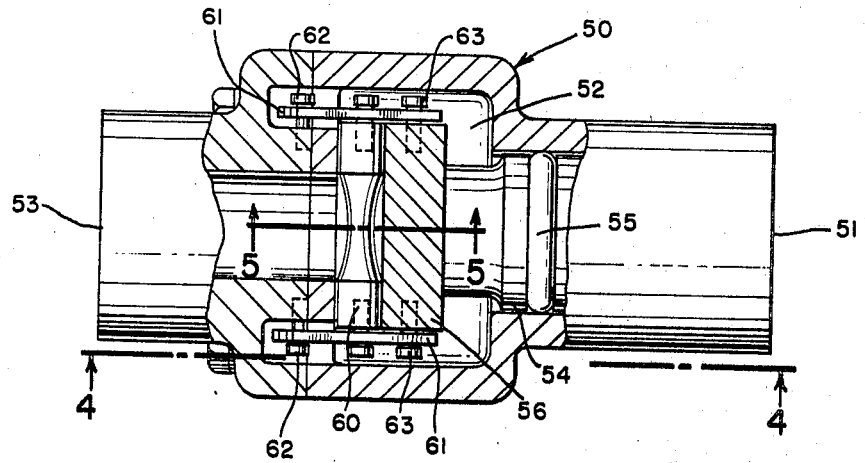
FIG. 3 is a bottom view in partial section of a variant form of the valve shown in FIG. 1.
Figure 4:
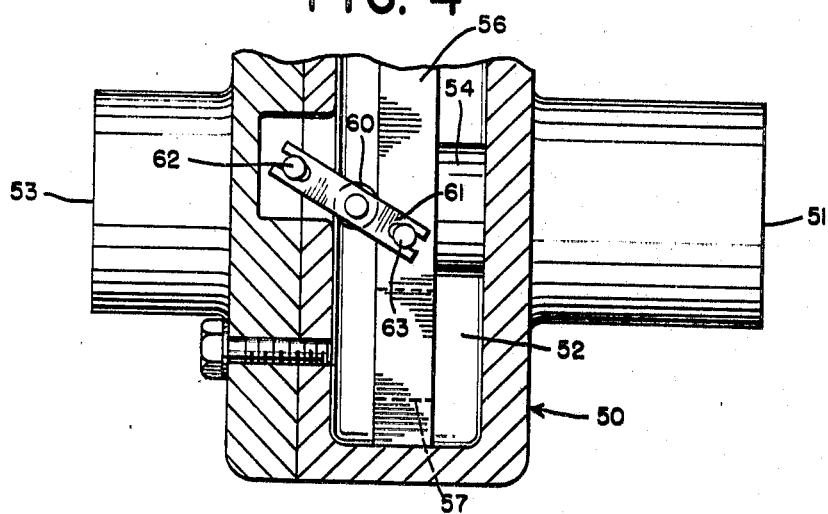
FIG. 4 is a sectional view of the valve shown in FIG. 3, taken along section lines 4—4 thereof.
Figure 5:
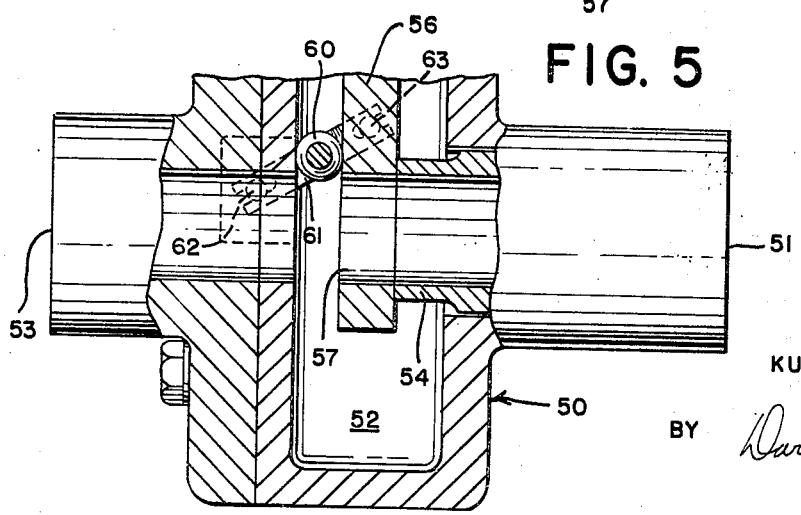
FIG. 5 is a sectional view of the valve shown in FIG. 3, taken along section lines 5—5 thereof.

Referring now to FIGS. 3, 4 and 5, there is illustrated a variant form of the invention. Valve body 50 includes an inlet port 51, central chamber 52, and outlet port 53, similar to those described above. Also present is a seating element 54, O-ring 55, and movable shear plate 56 with shear plate orifice 57 of the same type described above.

The elements referred to in the preceding paragraph operate in essentially the same way as the previously-described elements of FIGS. 1 and 2. Therefore, no further discussion of these elements is deemed necessary.

Referring now to the different elements incorporated in this valve of FIGS. 3, 4, and 5, a single roller 60 is rotatably and pivotally mounted on link 61 between shear plate 56 and valve body 50. Roller 60 is in continuous contact with and thus is rollable against both shear plate 56 and valve body 50. Link 61 has slotted ends which engage undercut pins 62 and 63 which are press-fitted into valve body 50 and shear plate 56 respectively.

FIG. 4 shows the valve in its closed position. It can be seen that in this position roller 60 is aligned axially on the axes of inlet port 51 and seating element 54, thus being properly centered to balance the force exerted on shear plate 56 by seating element 54 and by the inlet pressure.

FIG. 5 shows the valve in its open position. As shear plate 56 moves upwardly to align orifice 57 with seating element 54, plate 56 also pivots link 61 upwardly about pin 62. This causes roller 60 to also move upwardly so as to clear orifice 57 when orifice 57 is aligned with seating element 54. Roller 60 has a reduced central cross-section (see FIG. 3) to assure no interference with the flow through orifice 57.

This arrangement is particularly advantageous for several reasons. Among these reasons is the simplicity of construction and operation. The straight-line orientation of pins 62 and 63 with roller 60 dictates the proper, centrally oriented position of roller 60 when the valve is closed, and also moves roller 60 out of the way when the valve is opened. Also, the valve is very trouble-free, since it is less likely to become jammed or to bind due to dirt. The slotted link 61 and floating seating element 54 allow roller 60 to pass freely over dirt or grit on shear 56 or on the inner face of valve body 50.

The arrangement of FIGS. 3, 4 and 5 is also advantageous because it permits the roller 60 to roll with the shear plate 56. Roller 60 moves with shear plate 56 half the distance that the plate moves. Thus there is less friction loss. Also there is less wear on the valve.

It will also be apparent to those skilled in the art that low friction rolling or sliding means other than rollers 32 and 60 could be used with this valve. Likewise a three-way or other type of multiple inlet or multiple outlet type valve could be adopted to the invention as well as the two-way valve shown. Also actuators other than solenoid type actuators can be used.

These and other variations and modifications which do not depart from the spirit of the invention will be obvious to those skilled in the art. The particular embodiment described above is intended only for illustration of one form of the invention and not intended to limit the scope of the invention.

I claim:

1. In a valve having a valve body, inlet and outlet ports and flowpath therebetween in said body, a movably mounted orifice plate intermediate said ports which moves between an open and closed position for controlling the flow through said valve, means movably mounting said plate as it is moved between an open and closed position comprising low friction rotatable bearing means in laterally movable rotating engagement with said plate for exerting a force on said plate opposite to the pressure against the inlet face of said plate, and means for repositioning said bearing means in response to the movement of said plate comprising:

pivotable link, means pivotably connecting said link to the valve body at a first connection point on said link, means pivotably connecting said link to said plate at a second connection point on said link, means rotatably connecting said link at a third point thereon between said first and second connection points to said rotatable bearing means, said first, second and third connection points being located so as to laterally reposition said rotatable bearing means off the flowpath axis when the valve is opened.

2. In a valve as claimed in claim 1, said repositioning means comprising a pivotable link, means rotatably mounting said bearing means on said link between said plate and the valve body, means pivotably connecting one end of said link to said valve body, means pivotably connecting the opposite end of said link to said plate, said bearing mounting means and both said pivotable connecting means lying along a single axis, said pivotable connecting means being adapted to permit lateral shifting along said axis as the link is pivoted, whereby said bearing means moves with said plate between said plate and the valve body when the plate is moved, said link and connecting means being located to position said bearing means opposite the force applied against the plate along the longitudinal axis of the flow path when the valve is closed and to position said bearing means off the axis of the flowpath when the valve is opened.

References Cited

UNITED STATES PATENTS

| | | | |
|---|---|---|---|
| 1,779,637 | 10/1930 | Phillips | 251—203 XR |
| 2,063,655 | 12/1936 | Barner | 251—174 XR |
| 2,916,252 | 12/1959 | Hobbs | 251—129 |
| 3,037,738 | 6/1962 | Jackson | 251—172 |
| 3,274,984 | 9/1966 | Dolfi | 251—129 XR |
| 358,719 | 3/1887 | Baush | 251—203 |

HAROLD W. WEAKLEY, Primary Examiner

U.S. Cl. X.R.

251—129, 174, 193

PO-1050
(5/69)

UNITED STATES PATENT OFFICE
CERTIFICATE OF CORRECTION

Patent No. 3,482,816      Dated Dec. 9, 1969

Inventor(s) K. H. Arnold

It is certified that error appears in the above-identified patent and that said Letters Patent are hereby corrected as shown below:

In the Specification, commencing at column 2, line 10, after the word "pressure" insert a period (.) and immediately after the period insert --This--.

After the above referenced insertion of the word "This" insert that part of the specification starting with "rolling" at column 3, line 8, and ending with "range" at column 3, line in addition, correct the spelling of "loses" to --losses-- at column 3, line 8, and correct the spelling of the word "recognized" to --recognize-- at column 3, line 27.

After the insertion referred to in paragraph 2 above, insert that part of the specification starting with "of flow" at column 2, line 47 and ending with "tubular" at column 3, line 7.

SIGNED AND
SEALED
AUG 11 1970

(SEAL)
Attest:

Edward M. Fletcher, Jr.
Attesting Officer

WILLIAM E. SCHUYLER, JR.
Commissioner of Patents